United States Patent [19]

Ming et al.

[11] Patent Number: 4,821,207

[45] Date of Patent: Apr. 11, 1989

[54] AUTOMATED CURVILINEAR PATH INTERPOLATION FOR INDUSTRIAL ROBOTS

[75] Inventors: Loo Ming, Ann Arbor; Veljko Milenkovic, Birmingham, both of Mich.

[73] Assignee: Ford Motor Company, Dearborn, Mich.

[21] Appl. No.: 43,581

[22] Filed: Apr. 28, 1987

[51] Int. Cl.$^4$ .................. G06F 15/46; G05B 19/415; G05B 19/42

[52] U.S. Cl. .................. 364/513; 318/568.15; 318/573; 364/193; 364/192; 364/474.31

[58] Field of Search ............ 364/513, 167-171, 364/191-193, 474, 475; 318/568, 573; 901/2-6, 9; 414/730

[56] References Cited

U.S. PATENT DOCUMENTS

| | | | |
|---|---|---|---|
| 4,550,383 | 10/1985 | Sugimoto | 364/169 X |
| 4,635,206 | 1/1987 | Bhatia | 364/169 X |
| 4,680,519 | 7/1987 | Chano et al. | 364/169 X |
| 4,689,756 | 8/1987 | Koyama et al. | 364/169 X |
| 4,698,777 | 10/1987 | Toyoda et al. | 364/169 X |

Primary Examiner—Joseph Ruggiero
Attorney, Agent, or Firm—Frank G. McKenzie; Donald J. Harrington

[57] ABSTRACT

A method for generating a path to be followed by the end effector of an industrial robot includes defining the location of points on the path, recording the coordinates of the points in cartesian space, determining the slope of the path at each of the taught points with reference to a code that defines the nature of the path in the vicinity of each point, calculating the direction vector representing the slope at each taught point, locating the position and slope of a point midway between successive taught points, connecting the taught points and the midpoints with a circular arc whose slope is equal to the slope at the taught points and midpoints, and generating points between the taught points with reference to the desired velocity of the end effector at each of the generated points on the path to be traversed.

13 Claims, 3 Drawing Sheets

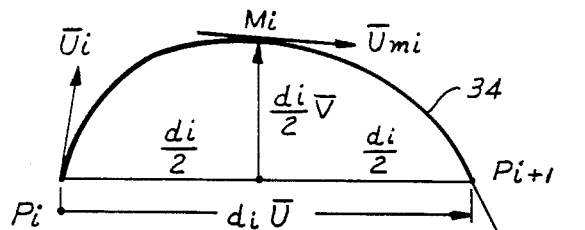
FIG. 7
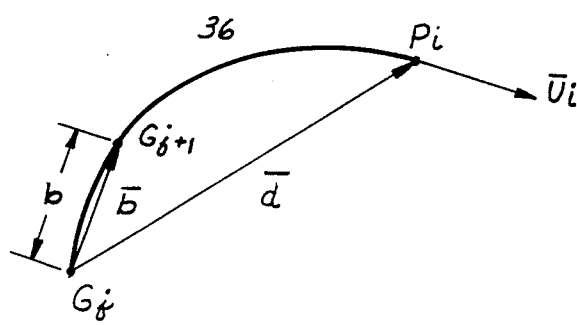
FIG. 9
FIG. 2
RECORD CODE & COORDINATES OF TAUGHT POINTS DETERMINE SLOPE AT TAUGHT POINTS
↓
LOCATE MIDPOINTS DETERMINE SLOPE OF ARCS AT MIDPOINTS
↓
GENERATE COORDINATES OF POINTS LOCATED BETWEEN TAUGHT POINTS
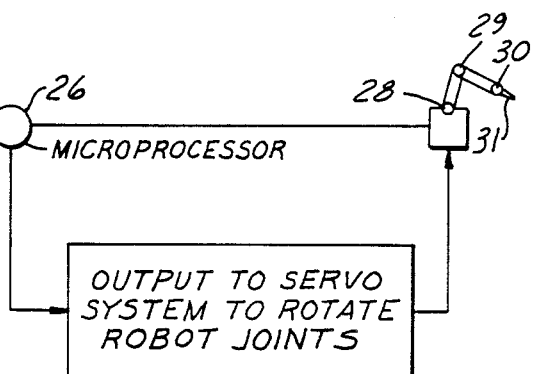
OUTPUT TO SERVO SYSTEM TO ROTATE ROBOT JOINTS

AUTOMATED CURVILINEAR PATH INTERPOLATION FOR INDUSTRIAL ROBOTS

BACKGROUND OF THE INVENTION

1. Field of the Invention

This invention relates to the control of an end effector of an industrial robot that moves continuously along a predetermined path. More particularly, this invention pertains to the definition of the path along which the end effector moves.

2. Background of the Invention

Industrial robots perform tracking tasks by continually moving a tool or end effector held at the end of a robot arm. Control strategies have been developed, such as point-to-point and continuous path techniques, to guide the movement of the robot tool along the path. The point-to-point technique causes the tool to move preferably in straight lines between a sequence of points that define a path determined by robot joint angle interpolation. The continuous path technique for controlling the movement of the tool requires storing in a computer memory the coordinates of a very large number of closely spaced points that define the path. Another technique to control the path generates a sequence of points on the path in task space and then transforms the points to robot joint angles for execution. Programming the tracking task is difficult and editing a defined path becomes nearly impossible.

The curvilinear path interpolation procedure for controlling movement of the robot tool along a path generally requires a polynomial fit of a sequence of discrete points in a task space to produce a dynamically smooth and efficient trajectory. Such paths are of little relevance where the robot is to perform a tracking function because the correct path is uniquely defined by the geometry of the workpiece.

In the related field of numerically controlled machines, circular, elliptical, parabolic curvilinear interpolation has been practiced for some time. The problem of robot tracking is different from numeric control techniques, however, because here the programmer usually does not know the analytical description of the path, such as its radius, or the location of the center of a circular arc, or the major or minor axes of an ellipse.

The multi-circular curvilinear interpolation method of this invention defines a sufficiently accurate tracking path in cartesian space by using concatenated segments of circular arcs. In this way, a curve of continuously varying curvature is fitted by curves of stepwise changing curvature, whereby portions of the required path may be made easily to conform to circular or straight paths.

SUMMARY OF THE INVENTION

The robot operator defines selected points located on the path along which the end effector will move automatically after the path is defined. The coordinates of the selected points are recorded and coded to specify whether they represent intermediate or end points. The selected points or taught points are located preferably at the transition points of perceived curvature changes, such as the points of tangencies of circular arcs and straight lines, or the junctions of steeper to shallow curves. Consequently, the spacing of the taught points tends to decrease with increasing curvature.

Next, a new sequence of densely spaced points called generated points is defined so that the curve they define passes through the taught points.

Because industrial robot paths consist of many unrelated portions, the path fitting should be developed on the basis of a limited number of adjacent points, rather than all data points, to influence a curve near any single point. Since most continuous path control systems require position commands to be updated at uniform time intervals, the algorithm that defines the path should be able to vary the space between the generated points so that the velocity of the tool is within specified limits at the respective generated point.

A major advantage of this method is the great reduction in the number of points needed to be specified or adjusted in defining a curvilinear path to be traversed by the end effector of the robot. With a large, densely spaced set of programmed points even a linear interpolation procedure may define a path with sufficient accuracy. The method of this invention, however, provides an advanced flexible curve fitting algorithm to help define the path with relatively few specified points. Because fewer points are required, the user can adjust the algorithm so that it accounts for specific geometric features of the desired path.

The path generated by mathematical interpolation may not match precisely the actual geometry of a seam to be welded or sealed, particularly so if the programmed points are widely spaced. The method of this invention not only permits insertion of additional points, if and where needed, but also assists the user in selecting places where additional points are to be inserted.

Upon receipt of a command during editing of the path, the control system moves the end effector on the generated path approximately midway between consecutive points previously selected. The user may then observe the offset of the intermediate point from the desired path and displace the intermediate point until it matches the desired path. This method will respond by executing an algorithm to deform the computed trajectory so that it passes through the adjusted location of the point.

BRIEF DESCRIPTION OF THE DRAWINGS

FIG. 2 shows schematically the elements of the control system according to this invention for defining the path of the end effector and for making the inverse transformation of the path coordinates to the robot joint coordinates, which articulate the robot arm and move the end effector.

FIG. 7 is a diagram showing circular arcs connecting taught points used to determine the location and slope at the midpoint.

FIG. 9 is a diagram showing a circular arc connecting taught points used to generate points located between the taught points consistent with the desired velocity of the end effector at each generated point.

DESCRIPTION OF THE PREFERRED EMBODIMENT

Figure 1:
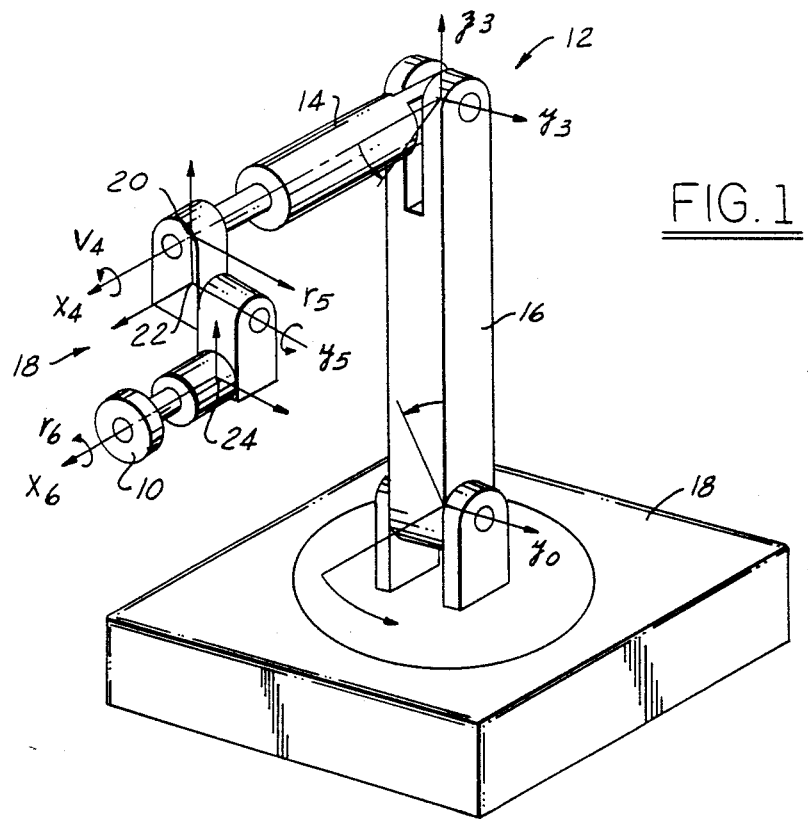
FIG. 1 is an isometric schematic representing the major linkage and minor or wrist linkage which connects the robot arm to the robot hand, on which the tool or end effector is carried.

FIG. 1 shows an articulated mechanism for moving an end effector or tool carried by a hand 10 of an industrial robot that includes a major linkage 12, comprising a robot arm 14 and a boom 16 mounted on a base 18, which is fixed to ground. The arm is supported for pivoting about an axis $y_3$; the boom is supported for rotation about axis $z_3$ and for pivotal movement about axis $y_{10}$.

The major linkage produces gross motion of the end effector as a result of selective rotation about these axes, but the minor linkage 18, called the wrist mechanism, produces more precise definition of the position and orientation of the end effector as it moves along a predetermined path. The minor linkage or wrist include a first joint 20 mounted for rotation about axis $x_4$, a second or intermediate joint 22 pivotable about axis $y_5$, and a third joint 24 pivotable about axis $x_6$.

The end effector moves during fixed time intervals between the points that define the path it follows. The coordinates of these points are converted by algorithms stored in computer memory accessible to a computer or microprocessor 26, to output signals transmitted from the microprocessor to servo motors 28–30. In response to the output signals, the motors cause rotation about their respective axes $x_4$, $x_6$, $y_0$, $y_3$, $y_5$ and $z_3$ and the end effector traverses the defined path. The velocity of the end effector varies along the path and is determined by dividing the distance between consecutive points by the fixed time interval during which the tool moves between consecutive points.

The method of this invention allows the user to specify the path to be traversed by the tool automatically in accordance with the path defined by generated points. The shape of the path is specified by defining the location in three dimensional space of a sequence of taught points, which are located on a workpiece along a seam to be welded, a joint to be sealed, etc. Other requirements of the tool motion, at each of the taught points supplied as input may include specifying the velocity of the tool, locations where the motion stops and resumes, points where action by the tool on the workpiece occurs such as welding current, paint flow or sealant flow. The method of this invention addresses only the input information that influences the shape and location of the path and the geometric or temporal spacing of the points.

Figure 3:
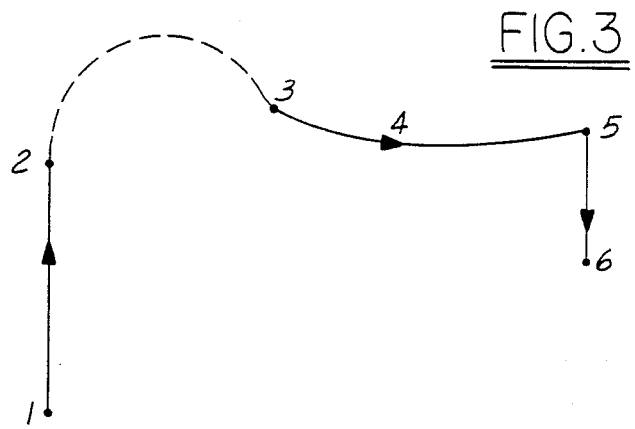
FIG. 3 shows a portion of a path to be followed by the end effector of a robot connecting points on the path with working strokes and a transition stroke.

Given a numbered sequence of taught points in three dimensional space, this method generates a set of points that define the path which connects the taught points. The operator moves the position of the end effector to each taught point in sequence and codes each point with respect to whether it is an end point 1 or 6 on the path or an intermediate point 3, 4 or 5, as shown in FIG. 3. The taught points should be located at transition points of perceived curvature changes, such as the points of tangency of circular arcs and straight lines, or the junctions of steeper to shallower curves. The spacing of the taught points tends to decrease with increasing curvature. The computing system records the coordinates of the taught points and code, creates a taught point file of the coordinates, the code and the corresponding taught point number, and stores this file in memory accessible to the arithmetic logic unit of the computer 26.

The slope, or instantaneous direction of end effector motion, is an attribute of the path used to define by this method the location of the generated points. To determine the slope at the taught points before the path is defined, account is made of working strokes and transition strokes, the smooth transition strokes that connects the working strokes. In FIG. 3, a straight line working stroke 1–2 is connected with a curvilinear working stroke 3–5 by a transition stroke 2–3.

Figure 4:
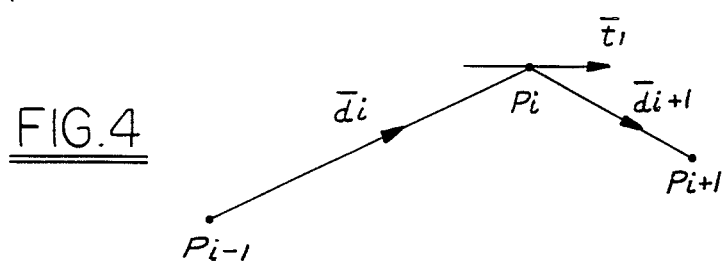
FIG. 4 is a diagram showing the relative position of slope vectors at successive taught points, the intermediate taught point being a stop point.

For a stroke spanning three or more taught points, $P_{i-1}$, $P_i$, $P_{i+1}$, such as that shown in FIG. 4, the slope at the intermediate point is a vector $\overline{t_i}$ lying in the plane containing the three points such that the angles it forms with the lines joining it to the adjacent taught points are equal. In vector form where $\overline{d_i}$ is a vector from $P_{i-1}$ to $P_i$ of magnitude $d_i$; $\overline{d_{i+1}}$ is a vector from $P_i$ to $P_{i+1}$ of magnitude $d_{i+1}$; and $\overline{t_i}$ is a slope vector at $P_i$ of arbitrary magnitude, then $$\overline{t_i} = \overline{d_i}/d_i + \overline{d_{i+1}}/d_{i+1} \tag{1}$$

Figure 5:
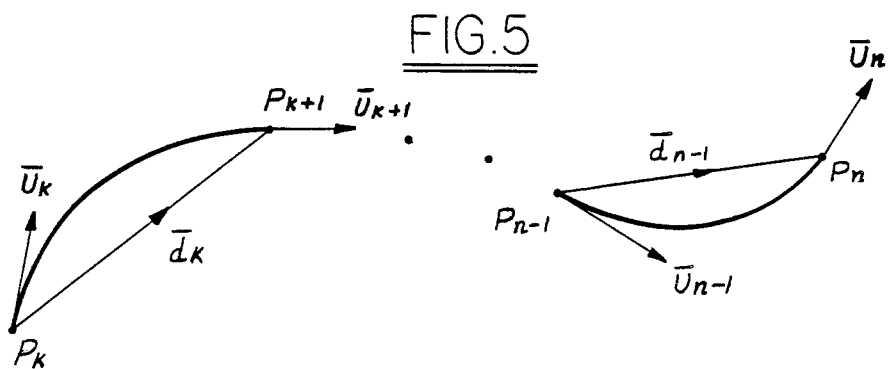
FIG. 5 is a diagram showing the construction of circular arcs connecting taught points used with the determination of the slope vector at the points.

The slope at each of the two taught points of a working stroke is the tangent to a circular arc spanning one point and the other point whose slope is determined by equation (1). Thus, with reference to FIG. 5, where the starting taught point is $P_k$ and the end point is $P_n$ $\overline{u_k}$, $\overline{u_{k+1}}$, $\overline{u_{n-1}}$, $\overline{u_n}$ are unit slope vectors at points $P_k$, $P_{k+1}$, $P_{n-1}$, $P_n$, respectively;

$\overline{u_{dk}}$, $\overline{u_{dn}}$ are unit direction vector from $P_k$ to $P_{k+1}$, and from $P_{n-1}$ to $P_n$, respectively; and $$\overline{u_K} = 2(\overline{u_{dk}} \cdot \overline{u_{k+1}})\overline{u_{dk}} - \overline{u_{k+1}} \tag{2}$$

$$\overline{u_n} = 2(\overline{u_{n-1}} \cdot \overline{u_{dn}})\overline{u_{dn}} - \overline{u_{n+1}} \tag{3}$$

The slopes of the two end points of a transition stroke is equal to the slopes at the end points of its neighboring working strokes. Where the working stroke is a straight line, the slope at each point is the direction vector containing the points.

Next, from the set of taught points and the slopes or unit direction vectors associated with each taught point $P_i$, $P_{i+1}$, the location of a set of midpoints $M_i$ is determined. It is possible to construct circular arcs spanning consecutive pairs of taught points, each arc being connected to its adjacent arc by a revolute joint and having its center located at $c_1$, $c_2$, $c_3$, as illustrated in FIG. 7. The location of each midpoint satisfies the following two conditions: (i) $M_i$ lies in the plane midway between $P_i$ and $P_{i+1}$, such that the distance from $P_i$ to $M_i$ is equal to the distance from $M_i$ to $P_{i+1}$, and (ii) a first circular arc 32 passing through $P_i$ and $M_i$, whose tangent at $P_i$ coincides with unit vector $u_i$ and a second circular arc 34 passing through $M_i$ and $P_{i+1}$, whose tangent at $P_{i+1}$ coincides with unit vector $\overline{u_{i+1}}$, have a common tangent $\overline{u_{mi}}$ at point $M_i$ where the arcs join.

The term used to locate the midpoint and define the midpoint slope $\overline{u_{mi}}$ in vector notation with reference to FIG. 7 are:

$d_i$—the distance from $P_i$ to $P_{i+1}$, a scalar;

$\bar{u}$—a unit direction vector from $P_i$ to $P_{i+1}$;

$c_1 = \bar{u}_i \cdot \bar{u}$; $c_2 = \bar{u}_{i+1} \cdot \bar{u}$;
$c_3 = \bar{u}_i \cdot \bar{u}_{i+1}$, vector dot products;
$\bar{s}_1 = \bar{u}_i - c_1 \bar{u}$; $\bar{s}_2 = \bar{u}_{i+1} - c_2 \bar{u}$;
$q = \sqrt{2(1-c_3) + 4c_1 c_2}$ a scalar; and
$\bar{v} = (\bar{s}_1 - \bar{s}_2)/(q + c_1 + c_2)$, a vector of undetermined magnitude.

The midpoint slope expressed in these terms is $$\bar{u}_{mi} = [q\bar{u} - (\bar{s}_1 + \bar{s}_2) - (c_2 - c_1)\bar{v}]/2 \qquad (4)$$

The location of $M_i$ expressed as a directed vector is $$P_i \rightarrow M_i = d_i(\bar{u} - \bar{v})/2. \qquad (5)$$

Figure 6:
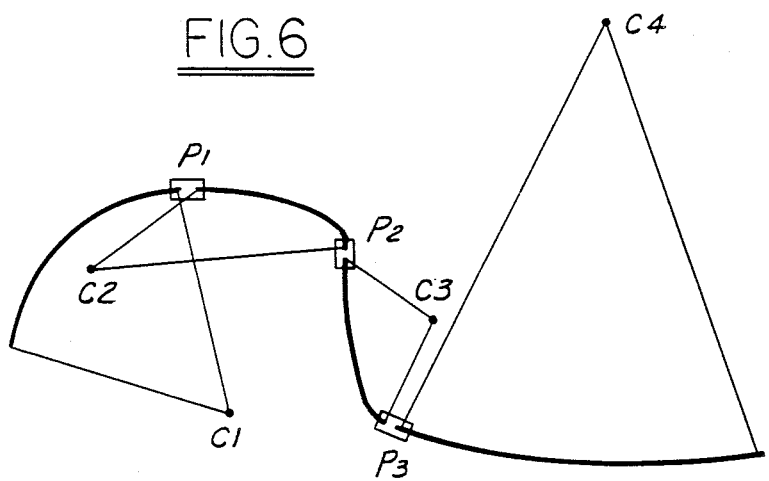
FIG. 6 shows a series of concatenated circular arcs connected at defined points by revolute joints.
Figure 8:
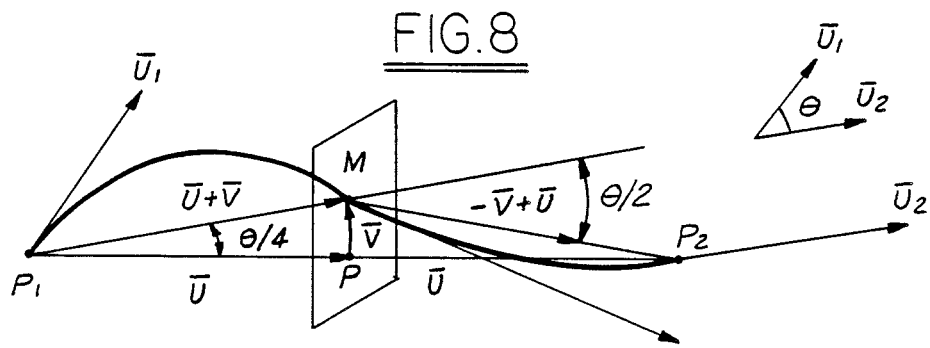
FIG. 8 is a more detailed diagram showing circular arcs connecting taught points used to determine the location and slope at the midpoint.

The complete path to be traversed by the robot tool can be defined as a series of connected circular arcs by the dual arc method described with reference to FIG. 7. This method produces a set of midpoints $M_i$ and midpoint slopes $\bar{u}_{mi}$ from original taught points and taught point slopes. Because the arcs are mutually tangent at the midpoints and are tangent to the slopes at the respective tangent points, they form a smooth curve, such as those shown in FIGS. 6 and 8.

The path generated by this method is not a continuous curve but rather is a sequence of closely spaced discrete generated points located on the arcs. The generated points are later converted to input commands issued at a constant frequency rate, the constant servo update rate, to the servo system of the robot. Therefore, the generated point spacing must be proportional to the desired variable velocity of the robot tool at the respective points on the path.

To generate points along the circular arcs, a recursive procedure is used, which has as input information, schematically shown in FIG. 9, the current point $G_j$, a tangent taught point $P_i$, a tangent slope or unit direction vector $\bar{u}_i$, and a step distance b whose length corresponds to the servo cycle rate and the tool velocity at point $G_j$. The algorithm determines the next generated point $G_{j+1}$, such that (i) the distance from $G_j$ to $G_{j+1}$ is b and (ii) the tangent to a circular arc 36 passing through $G_j$, $G_{j+1}$, $P_i$ is $\bar{u}_i$.

The terms used to determine the variables b and $\bar{u}_i$ in vector notation with reference to FIG. 9 are:

$\bar{b}$—the vector from $G_j$ to $G_{j+1}$ whose length is b;
$\bar{d}$—the vector from $G_j$ to $P_i$;
$\bar{u}_i$—the unit vector tangent to the circular arc at $P_i$; and
$d^2 = \bar{d} \cdot \bar{d} = |\bar{d}|^2$; $e = \bar{d} \cdot \bar{u}_i$, which are scalar dot products.

It can be shown that $$\bar{b} = k_1 \bar{d} - k_2 \bar{u}_i$$

where
$k_2 = [\sqrt{(eb)^2 + d^2(d^2 - b^2)} - (eb)]b/d^2$;
$k_1 = (2ek_2 + b^2)d^2$.

The only case of practical interest is where $d > = b$, otherwise point $G_j$ is beyond $P_i$ and lies on the adjacent arc. This condition also ensures that $k_1$ and $k_2$ are real.

This procedure permits sequential computation of all generated points $G_j$ (j=1, 2, ... n) which define the entire path. The procedure is started by locating the first generated point $G_1$ at the beginning of the path, i.e., at the first taught point and the first target point to the first midpoint $M_1$. Point generation continues with the same midpoint until d, the length of the vector d, becomes smaller than the desired generated point spacing b. Thereafter, the next generated point is placed on the following circular arc. Therefore, the tangent point must be recognized in the forward direction, the direction of traversal, first to the second taught point $P_2$, then to the next midpoint $M_2$, etc.

The generation of the points does not involve the radius of curvature of the circular arcs. Therefore, the solution is consistent even if a portion of the path is a straight line whose radius is infinite.

Having described the preferred embodiment of our invention, what we claim and desire to secure by U.S. Letters Patent is:

1. A method for generating a path in cartesian space from a sequence of points located on connected circular arcs to be traversed by the end effector of an industrial robot comprising:
    recording the coordinates of a low number of taught points located on the path to be traversed, at perceived changes of curvature of the path;
    determining at each taught point the slope $\bar{u}_i$ of a stroke connecting consecutive taught points;
    determining the location of a set of midpoints $M_i$, each located in the plane that is midway between first and second consecutive taught points $P_i$ and $P_{i+1}$;
    determining at each midpoint the common tangent of two circular arcs, the first arc passing through the first taught point and the midpoint and having its tangent at the first taught point coincident with the slope thereat, the second arc passing through the midpoint and the second taught point and having its tangent at the second taught point coincident with the slope thereat;
    determining in accordance with the desired velocity of the end effector at a generated point the step distance between successive generated points;
    determining the location of a relatively large set of next generated points $G_{j+1}$, each generated point being located on a circular arc passing through a current generated point $G_j$ and a taught point $P_i$, whose slope is the corresponding unit direction vector $\bar{u}_i$, such that the distance from $G_j$ to $G_{j+1}$ is substantially equal to or greater than the corresponding step distance;
    repeating the step of determining the position of generated points until the distance from $G_j$ to $G_{j+1}$ is substantially equal to the step distance; and
    moving the angular position of the joints of the robot in accordance with the location of the generated points whereby the end effector traverses the path that connects the generated points.

2. A method for generating a path in cartesian space from a sequence of points located on connected circular arcs to be traversed by the end effector of an industrial robot comprising:
    recording the coordinates of a low number of taught points located on the path to be traversed, at perceived changes of curvature of the path;
    determining at each taught point the slope $\bar{u}_i$ of a stroke connecting taught points;
    determining the location of a set of midpoints $M_i$, each located in a plane that is located midway between consecutive taught points $P_i$ and $P_{i+1}$ and located on first and second circular arcs respectively connecting the midpoint with the corresponding consecutive taught points, each circular arc having its tangent at the corresponding taught point coincident with the slope $\overline{u}_i$ thereat;

determining at each midpoint the common tangent of said circular arcs;

determining in accordance with the desired velocity of the end effector at a generated point the step distance between successive generated points;

determining the location of a relatively large set of next generated points $G_{j+1}$, each generated point being located on a circular arc passing through a current generated point $G_j$ and a taught point $P_i$, whose slope is the corresponding unit direction vector $\overline{u}_i$, such that the distance from $G_j$ to $G_{j+1}$ is substantially equal to or greater than the corresponding step distance;

repeating the step of determining the position of generated points until the distance from $G_j$ to $G_{j+1}$ is substantially equal to the step distance; and moving the angular position of the joints of the robot in accordance with the location of the generated points whereby the end effector traverses the path that connects the generated points.

3. The method of claim 2 wherein the step of determining the location of a set of midpoints $M_i$, each located in a plane that is located midway between consecutive taught points $P_i$ and $P_{i+1}$ and located on first and second circular arcs respectively connecting the midpoint with the corresponding consecutive taught points comprises:

determining the distance $d_i$ between the taught points;

defining a unit direction vector $\overline{u}$ from $P_i$ to $P_{i+1}$;

defining a vector $\overline{v}$ of undetermined magnitude, extending between the middle of the line that connects consecutive taught points and the corresponding midpoint such that $\overline{v} = (\overline{s}_1 - \overline{s}_2)/(q + c_1 + c_2)$ wherein $\overline{s}_1 = \overline{u}_i - c_1\overline{u};$ $\overline{s}_2 = \overline{u}_{i+1} - c_2\overline{u};$ $c_1 = \overline{u}_i \cdot \overline{u};$ $c_2 = \overline{u}_{i+1} \cdot \overline{u};$ $c_3 = \overline{u}_i \cdot \overline{u}_{i+1}$ and $q = \sqrt{2(1-c_3) + 4c_1c_2};$ determining the location of the respective midpoints as $P_i \rightarrow M_i = d_i(\overline{u} - \overline{v})/2.$ 4. The method of claim 2 wherein the step of determining at each midpoint the common tangent of said circular arcs includes defining the vector $\overline{u_{mi}}$ such that $\overline{u_{mi}} = [q\overline{u} - (\overline{s}_1 + \overline{s}_2) - (c_2 - c_1)\overline{v}]/2$ wherein $\overline{s}_1 = \overline{u}_i - c_1\overline{u};$ $\overline{s}_2 = \overline{u}_{i+1} - c_2\overline{u};$ $c_1 = \overline{u}_i \cdot \overline{u};$ $c_2 = \overline{u}_{i+1} \cdot \overline{u};$ $c_3 = \overline{u}_i \cdot \overline{u}_{i+1}$ and $q = \sqrt{2(1-c_3) + 4c_1c_2};$ determining the location of the respective midpoints as $P_i \rightarrow M_i = d_i(\overline{u} - \overline{v})/2.$ 5. The method of claim 2 wherein the step of determining the location of a relatively large set of next generated points $G_{j+1}$, each generated point being located on a circular arc passing through a current generated point $G_j$ and a taught point $P_i$, whose slope is the corresponding unit direction vector $\overline{u}_i$, such that the distance from $G_j$ to $G_{j+1}$ is substantially equal to or greater than the corresponding step distance comprises:

determining the step distance b;

defining a vector $\overline{b}$ whose length is the step distance from the current generated to the next generated point;

defining a vector $\overline{d}$ extending from the current generated point to the corresponding taught point;

defining the unit vector $\overline{u}_j$ tangent to the corresponding arc at the taught point;

determining the position of the next generated point in accordance with the vector from the current generated point to the next generated point defined as $b = k_1\overline{d} - k_2\overline{u}_i$ wherein $d^2 = \overline{d} \cdot \overline{d} = |\overline{d}|^2,$ $e = \overline{d} \cdot \overline{u}_i,$
$k_2 = [\sqrt{(eb)^2 + d^2(d^2 - b^2)} - (eb)]b/d^2,$
$k_1 = (2ek_2 + b^2)/d^2.$ 6. The method of claim 5 further comprising repeating the step of determining the position of the next generated point until the distance from the current generated point to the next generated point is substantially equal to the step distance b.

7. The method of claim 5 further comprising repeating the step of determining the position of the next generated point until $\overline{d}$ is equal to or less than $\overline{b}$.

8. The method of claim 3 wherein the step of determining at each midpoint the common tangent of said circular arcs includes defining the vector $\overline{u_{mi}}$ such that $\overline{u_{mi}} = [q\overline{u} - (\overline{s}_1 + \overline{s}_2) - (c_2 - c_1)\overline{v}]/2$ wherein $\overline{s}_1 = \overline{u}_i - c_1\overline{u};$ $\overline{s}_2 = \overline{u}_{i+1} - c_2\overline{u};$ $c_1 = \overline{u}_i \cdot \overline{u};$ $c_2 = \overline{u}_{i+1} \cdot \overline{u};$ $c_3 = \overline{u}_i \cdot \overline{u}_{i+1}$ and $q = \sqrt{2(1-c_3) + 4c_1c_2};$ determining the location of the respective midpoints as $P_i \rightarrow M_i = d_i(\overline{u} - \overline{v})/2.$ 9. The method of claim 8 wherein the step of determining the location of a relatively large set of next generated points $G_{j+1}$, each generated point being located on a circular arc passing through a current generated point $G_j$ and a taught point $P_i$, whose slope is the corresponding unit direction vector $u_i$, such that the distance from $G_j$ to $G_{j+1}$ is substantially equal to or greater than the corresponding step distance comprises:

determining the step distance b;

defining a vector $\overline{b}$ whose length is the step distance from the current generated to the next generated point;

defining a vector $\overline{d}$ extending from the current generated point to the corresponding taught point;

defining the unit vector $\overline{u}_j$ tangent to the corresponding arc at the taught point;

determining the position of the next generated point in accordance with the vector from the current generated point to the next generated point defined as $b = k_1\overline{d} - k_2\overline{u}_i$ wherein $d^2 = \overline{d} \cdot \overline{d} = |\overline{d}|^2,$ $e = \overline{d} \cdot \overline{u}_i,$
$k_2 = [\sqrt{(eb)^2 + d^2(d^2 - b^2)} - (eb)]b/d^2,$
$k_1 = (2ek_2 + b^2)/d^2.$ 10. The method of claim 7 wherein the step of determining the location of a relatively large set of next generated points: $G_{j+1}$, each generated point being located on a circular arc passing through a current generated point $G_j$ and a taught point $P_i$, whose slope is the corresponding unit direction vector $u_i$, such that the distance from $G_j$ to $G_{j+1}$ is substantially equal to or greater than the corresponding step distance comprises
determining the step distance b;
defining a vector b whose length is the step distance from the current generated to the next generated point;
defining a vector extending from the current generated point to the corresponding taught point;
defining a unit tangent vector $u_i$ to the corresponding arc at the taught point;
determining the position of the next generated point in accordance with the vector from the current generated point to the next generated point defined as $$b = k_1\overline{d} - k_2\overline{u_i}$$

wherein $d^2 = \overline{d}\cdot\overline{d} = |\overline{d}|^2$, $e = \overline{d}\cdot\overline{u_i}$, $k_2 = [\sqrt{(eb)^2 + d^2(d^2 - b^2)} - (eb)]b/d^2$, $k_1 = (2ek_2 + b^2)/d^2$.

11. The method of claim 2 wherein the step of determining at each taught point the slope $u_i$ of a stroke connecting taught points comprises defining a vector $t_i$ such that $$\overline{t_i} = \overline{d_i}/d_i + \overline{d_{i+1}}/d_{i+1}$$

wherein $\overline{d_i}$ is a vector from a first taught point to an intermediate taught point located between said first taught point and a second taught point, $\overline{d_{i+1}}$ is a vector from the intermediate taught point to the second said point of magnitude $d_{i+1}$, and $\overline{t_i}$ is the slope vector at the second taught point of arbitrary magnitude.

12. The method of claim 5 wherein the step of determining the location of a set of midpoints $M_i$, each located in a plane that is located midway between consecutive taught points $P_i$ and $P_{i+1}$ and located on first and second circular arcs respectively connecting the midpoint with the corresponding consecutive taught points comprises:
determining the distance $d_i$ between the taught points;
defining a unit direction vector $\overline{u}$ from $P_i$ to $P_{i+1}$;
defining a vector $\overline{v}$ of undetermined magnitude, extending between the middle of the line that connects consecutive taught points and the corresponding midpoint such that $$\overline{v} = (\overline{s_1} - \overline{s_2})/(q + c_1 + c_2)$$

wherein $\overline{s_1} = \overline{u_i} - c_1\overline{u}$; $\overline{s_2} = \overline{u_{i+1}} - c_2\overline{u}$; $c_1 = \overline{u_i}\cdot\overline{u}$; $c_2 = \overline{u_{i+1}}\cdot\overline{u}$; $c_3 = \overline{u_i}\cdot\overline{u_{i+1}}$ and $q = \sqrt{2(1-c_3) + 4c_1c_2}$;
determining the location of the respective midpoints as $$P_i \to M_i = d_i(\overline{u} - \overline{v})/2.$$

13. The method of claim 2 wherein the step of determining at each taught point the slope of a stroke connecting consecutive taught points comprises determining slope vectors such that the slope at each of two taught points, a first taught point $P_k$ and an second taught point $P_n$, each located at an opposite end of a working stroke, is the tangent to a circular arc connecting said points and passing through taught points $P_{k+1}$ and $P_{n-1}$ located between the first and second taught points such that $$\overline{u_k} = 2(\overline{u_{dk}}\cdot\overline{u_{k+1}})\overline{u_{dk}} - \overline{u_{k+1}}$$

$$\overline{u_n} = 2(\overline{u_{n-1}}\cdot\overline{u_{dn}})\overline{u_{dn}} - \overline{u_{n+1}}$$

wherein $\overline{u_k}$, $\overline{u_{k+1}}$, $\overline{u_{n-1}}$, and $\overline{u_n}$ are unit slope vectors at points $P_k$, $P_{k+1}$, $P_{n-1}$, $P_n$, respectively, and $\overline{u_{dk}}$ and $\overline{u_{dn}}$ are unit direction vectors from $P_k$ to $P_{k+1}$ and from $P_{n-1}$ to $P_n$, respectively.

* * * * *